UNITED STATES PATENT OFFICE.

ALBERT B. AUER, OF BABCOCK'S GROVE, ILLINOIS.

IMPROVED COMPOUND FOR REMOVING SCALE FROM BOILERS.

Specification forming part of Letters Patent No. 47,914, dated May 30, 1865; antedated April 27, 1865.

*To all whom it may concern:*

Be it known that I, ALBERT B. AUER, of Babcock's Grove, in the county of Du Page and State of Illinois, have invented a new and useful Improvement in Compounds for Removing Incrustations from Steam-Boilers; and I do hereby declare that the following is a full, clear, and exact description of the same.

My said invention consists in compounding together certain ingredients herein specified, thereby producing a compound or mixture which will effectually remove all incrustations from steam-boilers without injuring or effecting the boiler in any respect whatever.

To enable those skilled in the art to understand how to compound and use my invention, I will proceed to describe the same with particularity.

The constituents of my invention are gum of catechu, common salt, saltpeter, and ground flaxseed.

To prepare a sufficient quantity of my compound to loosen and remove the incrustation from a ten-horse-power boiler, I take one-half of one pound of gum-catechu, three pounds of salt, one-half of one pound of saltpeter, and one pound of ground flaxseed, and pulverize finely, and thoroughly mix all together into a uniform mass, when the mixture is ready for use; or, if preferred, to apply the mixture in a fluid form; a sufficient quantity of water may be added to effect the desired change.

The proportions above specified need not be strictly adhered to, as the same may be varied and the same results be still attained from its use. For larger boilers a proportionately larger quantity of the compound should be used.

I apply said compound in the following manner: The mixture may be thrown into the boiler at any time when the steam is not on, and the action of the boiling water, when heat is applied, completes the operation, loosening and softening the incrustations, so that they are readily blown out from the boiler by the discharging of the steam.

The flaxseed is not an essential ingredient in this compound, as its only office is to leave a polished or smooth oily surface upon the interior of the boiler, which retards the formation of a second incrustation.

Having described my invention, I will specify what I claim and desire to secure by Letters Patent—

1. The compound herein described, composed of gum-catechu, salt, and saltpeter, substantially as and for the purposes specified.

2. In combination with a compound for removing boiler-incrustations, the employment of flaxseed as and for the purposes herein described.

A. B. AUER.

Witnesses:
W. E. MARRS,
L. L. COBURN.